April 14, 1936.   A. H. MAYNARD   2,037,334
FASTENER APPLYING IMPLEMENT
Filed Nov. 2, 1933   4 Sheets-Sheet 1

Inventor:
Arthur H. Maynard
By
Attorneys.

April 14, 1936.  A. H. MAYNARD  2,037,334
FASTENER APPLYING IMPLEMENT
Filed Nov. 2, 1933   4 Sheets-Sheet 2

Inventor:
Arthur H. Maynard
By Pennington and White
Attorneys.

April 14, 1936.  A. H. MAYNARD  2,037,334
FASTENER APPLYING IMPLEMENT
Filed Nov. 2, 1933    4 Sheets-Sheet 3

Inventor:
Arthur H. Maynard
By Pennington and White
Attorneys.

April 14, 1936.  A. H. MAYNARD  2,037,334

FASTENER APPLYING IMPLEMENT

Filed Nov. 2, 1933    4 Sheets-Sheet 4

Inventor:
Arthur H. Maynard
By
Attorneys.

Patented Apr. 14, 1936

2,037,334

UNITED STATES PATENT OFFICE 2,037,334

FASTENER APPLYING IMPLEMENT

Arthur H. Maynard, Warwick, R. I., assignor to Boston Wire Stitcher Company, Portland, Maine, a corporation of Maine Application November 2, 1933, Serial No. 696,353

37 Claims. (Cl. 1—3)

This invention relates to stapling and wire-stitching machines and particularly to a hand-operated device in the nature of an office appliance for use in attaching papers and documents and for other purposes such as stapling tags and labels to articles of commerce.

One object of the invention is to provide an implement of the type indicated which, while compact in size, is capable of a wide range of use.

Another object of the invention is to provide a device of the type indicated wherein the stapling mechanism is adjustable with respect to the clinching means to adapt the implement to operate on work of average thickness or to be extended to take work of extreme thickness and finally to be employed as a tacker without the use of the clinching means.

Another object of the invention is to provide a device of the type indicated having a magazine adapted to be loaded with a supply of staples at its forward end and provided with means for preventing ejection of the staples when the door or gate to the magazine is opened.

Another object of the invention is to provide a device of the type indicated having means for resisting the action of the feeding means on the staples while a staple is being applied to the work whereby to relieve the pressure and friction on the staple-driver to insure easier action of the stapling mechanism.

Another object of the invention is to provide a device of the type indicated having automatically-operated means for restraining the staple-feeding means from action during a partial stroke of the staple-driver whereby to prevent the feeding of a second staple before the one previously fed has been applied to the work.

Another object of the invention is to provide a device of the type indicated having an improved form of staple-supporter for preventing the fed staple from dropping out of the machine.

Another object of the invention is to provide a device of improved design in accordance with modern artistic standards yet simple in construction and adapted for economical methods of manufacture.

Another object of the invention is to provide a device of the type indicated which may be constructed with practically all of its parts stamped from sheet-metal and assembled with a minimum number of rivets, screws, bolts and nuts.

Another object of the invention is to generally improve the efficiency of the device and render it durable in use over long periods without danger of breakage or damage to its parts.

Further objects of the invention are set forth in the following specification which describes a preferred form of construction of the device, by way of example, as illustrated in the accompanying drawings. In the drawings.

Figure 1:
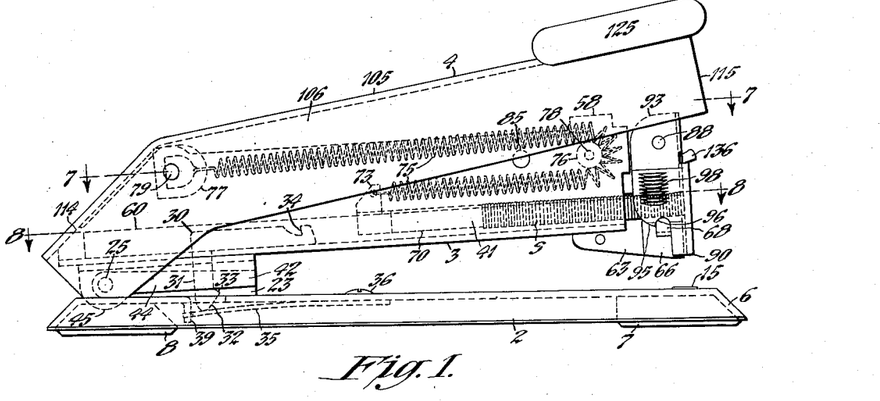
Fig. 1 is a side elevation of the improved stapling implement showing it adjusted for use as a desk or office appliance.
Figure 2:
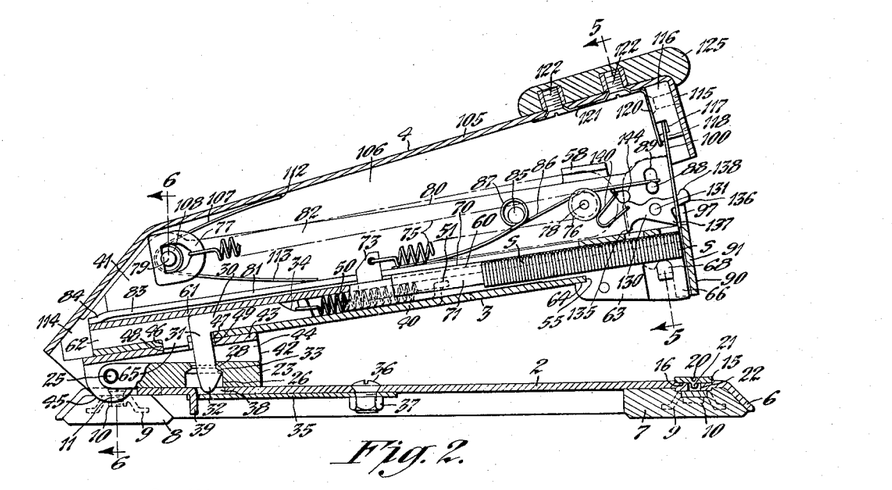
Fig. 2 is a longitudinal, sectional view of the same illustrating the stapling arm as adjusted to a height to adapt it for work of extreme thickness.
Figure 3:
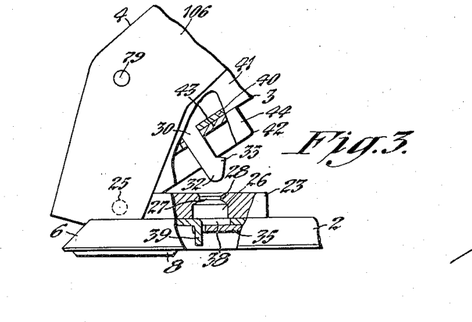
Fig. 3 is a detailed view of the rearward part of the implement showing portions of the base and stapling arm broken away to illustrate the latching means which provides for adjusting the position of the arm with respect to the base in accordance with the thickness of the work to be operated upon.

Referring first to Figs. 1 and 2 of the drawings, the present improved stapling implement comprises three main parts, namely: a base 2 for mounting the clinching means or anvil; a stapling arm 3 hinged at its rearward end to the base and carrying stapling mechanism at its forward end for cooperation with the clinching means; and a driver-lever 4 pivoted to the rearward end of the stapling arm and adapted to be swung downwardly with respect thereto to operate the stapling mechanism for driving the staples into the work and clinching their legs on the under side thereof.

As shown most clearly in Figs. 2, 4, 6 and 7, the base 2 of the machine is constructed of sheet-metal, stamped or embossed to form a generally flat rectangular top plate bounded by a depending beveled flange 6. Underlying the top of the base 2 at either end thereof are resilient pads 7 and 8, preferably constructed of rubber or the like and projecting downwardly beyond the rim of the flange 6 to provide feet on which the base rests. The pads 7 and 8 have metal plates or inserts 9 molded into the rubber and provided with threaded bosses 10 for receiving screws 11 countersunk in holes in the top plate of the base 2, see Figs. 2, 4, 6 and 7. As a convenient and economical form of construction the screws 11 which fasten the forward pad 7 are also employed for securing the clincher-anvil 15 in position on the base 2.

Figure 4:
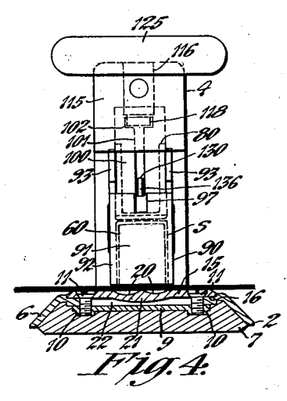
Fig. 4 is a front elevation of the implement showing the stapling arm depressed against the work and illustrating the fore part of the base in transverse section through the clinching anvil.

Referring to Fig. 4, the clincher-anvil 15 consists of a relatively flat strip of hardened metal fitted to a recess or depression 16 in the forward end of the base 2 and provided with countersunk holes at its ends for receiving the heads of the screws 11. At its mid portion the top of the clincher-anvil 15 is provided with grooves or depressions 20, the bottoms of which are of arcuate shape to adapt them to receive the legs of the staple as they are driven through the work to clinch them against the under side thereof. In the operation of forming the clincher-grooves 20 the stock of the clincher-plate is forced downwardly in a projecting ridge 21 which seats in a lateral slot 22 in the top of the base 2, see Fig. 2.

Fastened to the top of the base 2 at its rearward end is a hinge-block or mounting 23 for the stapling arm 3. The block 23 may be secured to the base 2 by welding, riveting or other suitable means and its rearward end, which overhangs a rectangular opening 24 in the base, is provided with a transverse hole for receiving a hinge-pin 25 on which the arm 3 is pivotally mounted. Adjacent the forward end of the block 23 is a circular opening or hole 26 which is reduced in diameter at its upper end where it joins a smaller counterbore 27, thus providing an annular beveled rim or flange 28 projecting radially into the opening. The beveled flange 28 provides a detent-seat for a latch 30, to be later described, which constitutes the means for adapting the stapling arm 3 to be raised above the base 2 in different positions of adjustment.

Fastened to the under side of the top plate of the base 2 is a flat leaf-spring 35 secured in place at its forward end by means of a stud 36 and nut 37. The top of the base 2 is punched or pierced with an opening 38 with the metal sheared therefrom bent downwardly to form a depending projection or finger 39 which engages through a slot in the rearward end of the spring 35 to restrain the latter from turning on its stud 36. The lower rounded end of the latch 30 normally rests against the top of the spring 35 to hold the arm 3 raised in the position shown in Fig. 1 of the drawings, the spring being adapted to flex to permit the arm to be swung downwardly about its pivot 25 during the stapling operation.

Figure 6:
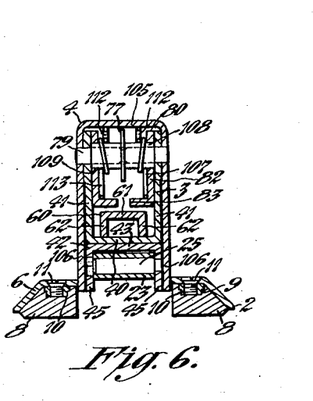
Fig. 6 is a transverse sectional view of the rearward part of the implement taken on line 6—6 of Fig. 2.
Figures 13, 16, 17, 18, 19:
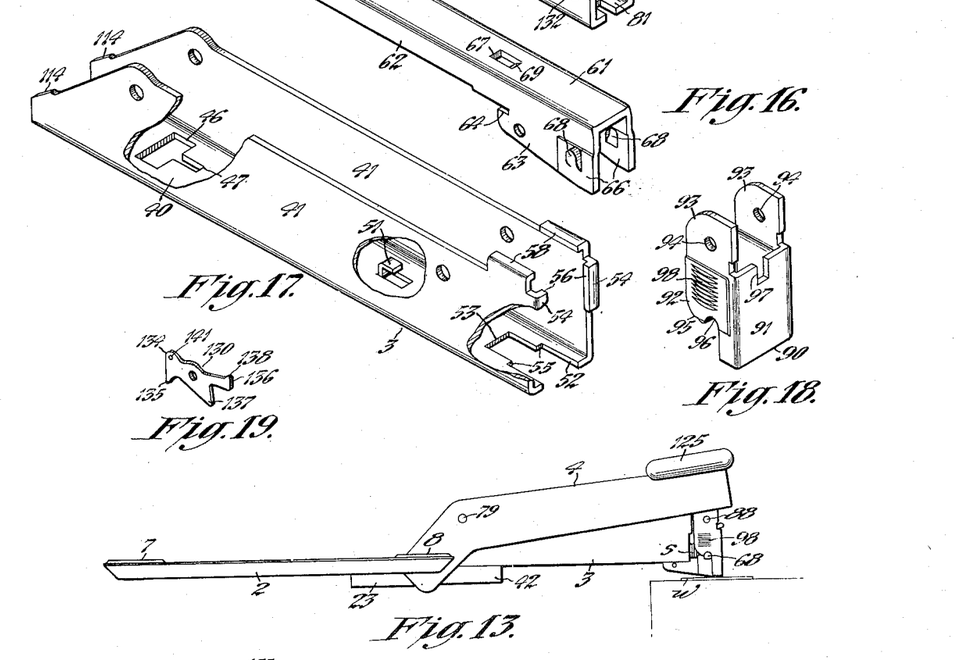
Fig. 13 is a view in reduced scale showing the implement with its base swung back to adapt the device to be used as a tacker.
Fig. 16 is a perspective view of the core for supporting the staples in feeding position in the arm.
Fig. 17 is a view of the stapling arm shown with its forward side partly broken away to illustrate the details of its structure.
Fig. 18 is a perspective view of the door or gate for the magazine in the stapling arm.
Fig. 19 is a perspective view of the check-pawl or detent-element for controlling the feed of the staples.

Referring now to Fig. 17, the stapling arm 3 is constructed from a strip of sheet-metal bent or struck up in channel shape with a bottom 40 and upstanding sides 41. Fastened to the under side of the arm 3 at its rearward end is a hinge-member 42 constructed from sheet-metal bent into inverted trough shape with a main portion 43 and depending sides or flanges 44. The flanges 44 are formed at their rearward ends with ears 45 pierced with holes for receiving the pivot-pin 25 which connects the arm 3 with the hinge-block or mounting 23. The hinge-member 42 may be secured to the under side of the arm 3 by spot welding, riveting or other suitable means in position to adapt its flanges 44 to straddle the hinge-block 23 as shown in Fig. 6. The bottom of the arm 3 is formed at its rearward end with a rectangular opening 46 from the forward side of which extends a narrow slot 47. The hinge-member 42 also has a corresponding opening 48 and slot 49 registering with the opening 46 and slot 47 in the bottom of the arm 3; the latch 30, previously referred to, being arranged to slide in the slots 47 and 49.

As shown most clearly in Fig. 2, the latch 30 is of right-angular or elbow shape with one arm 31 projecting downwardly through the slots 47 and 49 and formed at its end with a pointed head 32. The head 32 has a beveled shoulder 33 adapted to engage with the under side of the beveled flange 28 on the interior of the hole 26 in the hinge-block 23. The upper arm of the latch 30 is adapted to slide on the bottom of the arm 3, being provided with a notch 34 at its forward extremity for receiving the looped end of a helical spring 50. The opposite end of the spring 50 is anchored to a hook-shaped ear 51 sheared from the metal of the bottom of the arm 3 and bent upwardly as shown in Fig. 17.

It will be understood that the spring 50 tends to slide the latch 30 forwardly to maintain its shoulder 33 engaged with the beveled rim 28 when the arm 3 is raised to the position shown in Fig. 2, thus acting to detain the arm in this position. Normally, however, the weight of the arm 3 causes it to be lowered to the position shown in Fig. 1 with the rounded end of the latch 30 bearing against the top of the spring 35. The last-described position of the arm 3 is its normal one when the device is used as a desk appliance, but for operation on work of extreme thickness the arm may be raised into the position shown in Fig. 2. When it is desired to use the implement in the manner of a tacker, for example, as shown in Fig. 13, the base 2 is turned back into alinement with the arm 3. This is accomplished by forcibly swinging the arm 3 away from the base 2 to cause the shoulder 33 on the latch 30 to ride over the beveled rim 28 in the opening 26 of the hinge-block 23. To return the arm to first position it is only necessary to swing it back on its hinge until the end of the latch 30 rides across the beveled rim 28 in the opening 26, the sliding action of the latch 30 against the tension of its spring 50 permitting the engagement and disengagement of its shoulder 33 with the detent-rim.

The forward end of the arm 3 has its bottom formed with a reentrant opening or slot 52, the rearward end of which is narrowed at 53 to form lateral shoulders 55. Lugs 54 project forwardly from the sides 41 of the arm 3 and are bent inwardly to form oppositely facing portions 56. A pair of similar lugs 58 project above the top of the sides 41 of the arm 3 and are formed in the same manner; these several formations of the arm as last referred to being for a purpose as later explained.

The hollow arm 3 constitutes a magazine for a supply of staples s to be used in the machine, its interior being provided with a staple-support or core 60 resting against its bottom wall. Referring to Fig. 16 of the drawings, the staple-core 60 is constructed from sheet-metal bent into inverted channel shape with a top 61 and side walls 62. The side walls 62 are extended downwardly at the forward end of the core 60, forming wings 63 which are provided with notches 64 at their rearward end adapted to engage around the edges of the shoulder 55 between the slot 52 and its narrower portion 53 in the bottom wall 40 of the arm 3, see Fig. 2. At the rearward end of the core 60 its side walls 62 are formed with downwardly-projecting lugs 65 which engage through the rectangular opening 46 in the wall 40 of the arm 3 and the corresponding opening 48 in the hinge-member 42 when the core is seated against the bottom of the arm. With the core 60 assembled within the sides of the arm 3 in this manner the wing portions 63 at its forward end project downwardly through its slot or opening 52 to adapt them to bear against the work to be stapled. The wings 63 extend beyond the forward end of the arm 3 and are stamped or embossed outwardly to form lower projecting faces 66 which provide bearing seats for the magazine gate 90, to be later described. The embossed or outwardly projecting portions 66 of the wings 63 are punched on their inner sides to provide a pair of rounded projections or ears 68 on their outer faces which serve as detents for latching the door or gate 90; it being here noted that the gate closes down against the fore part of the core 60 to provide a throat or guideway through which the staples are driven into the work.

Figure 8:
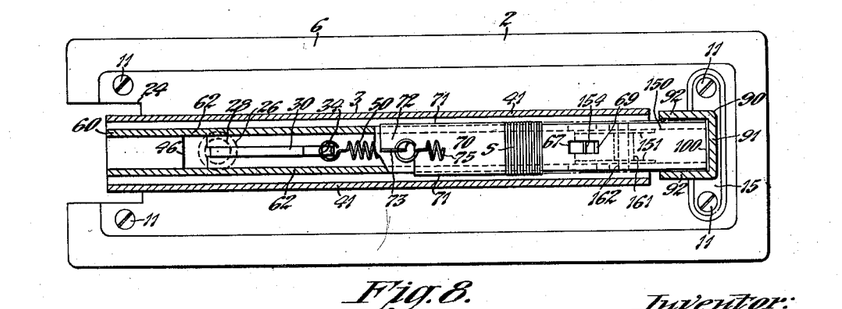
Fig. 8 is a similar plan view partly in section on line 8—8 of Fig. 1.

The staples s are straddled across the top of the core 60 and means are provided for sliding them forwardly thereon to feed them successively to the stapling mechanism comprising a staple-pusher 70 of usual form shown in Figs. 1, 2 and 8. The staple-pusher 70 is constructed of relatively thin sheet-metal bent or folded into inverted trough shape to adapt its main portion to overlie the top of the core 60 with its depending legs or flanges 71 straddling the sides thereof. The top of the pusher 70 is extended rearwardly at 72, see Fig. 8, and bent upwardly in a projection 73 which is pierced with a hole for receiving the hooked end of a helical spring 75. The spring 75 extends forwardly around a roller or pulley 76 and then reaches rearwardly with its end anchored to a loop-like member 77. The pulley 76 is mounted on a transverse pin 78 held in holes in the sides of the arm 3, while the member 77 engages around a pin 79 mounted in the same manner. As in the usual arrangement of devices of the present type the spring 75 acts to draw the pusher 70 forwardly on the core 60 to feed the staples to the stapling mechanism.

Figures 14, 15:
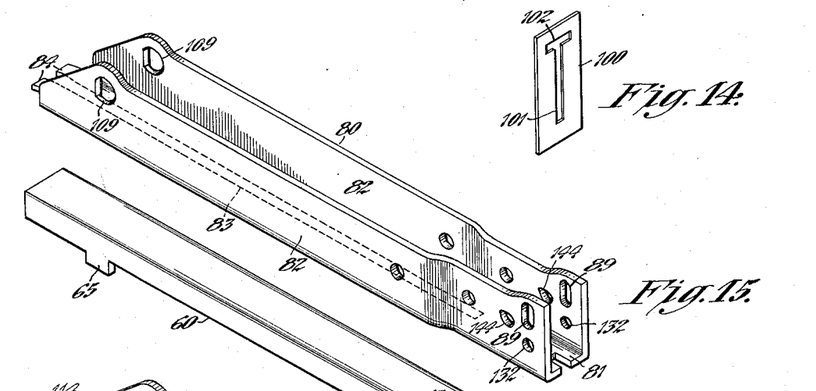
Fig. 14 is a perspective view of the staple-driver.
Fig. 15 is a perspective view of the staple-guide which constitutes a part of the stapling arm.

Enclosed within the arm 3 is another channel-shaped member 80, shown in perspective view in Fig. 15, which overlies the staple-core 60 in spaced relation thereto to serve as a guide to prevent the staples from riding up thereon. The channel-member or staple-guide 80 is formed with a bottom wall 81 and upstanding sides 82 which abut the inner faces of the side walls 41 of the arm 3. The bottom wall 81 is formed with a longitudinally extending slot 83 in which the upstanding projection 73 on the pusher 70 slides. At the rearward end of the member 80 the bottom wall 81 is extended in a pair of lugs 84 which are bent downwardly to rest against the top of the staple-core 60 to hold its rearward end against the bottom wall 40 of the arm 3. The member 80 is narrowed at its forward end to adapt its sides to fit between the inturned ends 56 of the lugs 54, see Fig. 7. The forward end of the member 80 is held in spaced relationship above the top of the core 60 by fastening it to the sides of the arm 3 by means of a transverse pin 85 projecting through holes in the arm and member, see Figs. 2 and 7. The pin 85 serves as the support and fulcrum for a hairpin-shaped wire spring 86, see Figs. 2 and 7, employed for a purpose as later explained.

The two opposite legs of the spring 86 are formed with helical coils 87 surrounding the pin 85 with the rearward portions of the legs curving downwardly and bearing against the bottom of the channel member 80. The forward U-shaped portion of the spring 86 is narrowed to extend between the drawn-in sides of the channel-member 80 and its terminal portion bears against the side of a pin 88 extending transversely through slots 89 in the sides of the member. The pin 88 serves as the pivot for the gate 90 to be next described.

Referring to Fig. 18, the gate 90 is of generally rectangular box-shape having a front wall 91, sides 92 and ears 93 extended upwardly from the sides. The ears 93 are adapted to straddle the sides of the channel-member 80 at the forward end thereof and are provided with holes 94 for receiving the ends of the pivot-pin 88. The sides 92 of the gate 90 are embossed or projected outwardly to adapt them to fit around the embossed faces 66 on the depending wings 63 of the core 60, thereby leaving a space between the sides of the core and the inner side walls of the gate to permit the staples to pass therethrough. The sides 93 of the gate 90 are cut away at the bottom and formed with curved edges 95 adapted to slide across the rounded top of the detent-abutments or ears 68 on the core 60 to cause the latter to seat in notches 93 formed in the sides of the gate. When the gate 90 is swung downwardly about its pivot 88 the curved edges 95 of its sides 92 act to cam it upwardly with the pin 88 rising in the slots 89 against the tension of the spring 86. After the gate 90 has been closed down with its front wall parallel to the forward end of the core 60 the spring 86 forces it downwardly to engage the notches 96 with the detent-ears 68 to lock the gate in closed position. The front wall 91 of the gate 90 is centrally slotted at 97, for a purpose as later explained, and its sides are knurled at 98 to provide a finger-grip.

In the present invention the means for operating the staple-driver 100 contemplates a novel form of construction with the driver suspended from the operating lever 4. The driver-lever 4, previously referred to, is constructed from sheet-metal bent into inverted trough shape with a top wall 105 and sides 106 folded downwardly therefrom. The driver-lever 4 is pivoted on the pin 79, previously referred to, which extends transversely through the sides of the stapling arm 3 and the inner channel-member or staple-guide 80. The rearward portion of the driver-lever 4 is bent or bowed downwardly to adapt it to overhang and enclose the rearward end of the stapling arm 3 with the lower edges of the side walls 106 projecting into the opening 24 in the top of the base 2, see Figs. 1, 2 and 7. The driver-lever 4 is normally held raised in position as shown in Fig. 1 under the tension of a hairpin-shaped spring 107 supported from the pivot-pin 79. Enclosing the pin 79 is a bushing 108 having its ends flatted off on one side and engaged in similarly shaped holes 109 in the sides 82 of the channel-member 80, see Figs. 7 and 17. The bushing 108 is thus held from turning on the pin 79 while the lever 4 pivots on the projecting ends of the pin. The rearward side of the bushing 108 is slotted at 110 to adapt it to receive the straight portion of the loop-member 77, previously referred to as constituting an anchorage for the pusher-spring 75. The pin 79 has a centrally disposed peripheral groove 111 with which the edge of the rearward portion of the loop-member 77 engages, this construction serving to retain the pin 79 from axial displacement while adapting it to be withdrawn when it is required to disassemble the parts by merely releasing the loop-member 77 from the slot 110 in the bushing 108.

The hairpin spring 107 has its legs coiled about the bushing 108 with the opposite ends thereof extending at an acute angle. The U-shaped portion 112 of the spring 107 bears against the top wall 105 of the lever 4 while the extremities of its opposite legs 113 are enclosed within the sides of the channel-member 80 resting against the bottom wall thereof, see Fig. 2. The tendency of the spring 107 is therefore to maintain the lever 4 in raised position as shown in Figs. 1 and 2, the upward movement of the lever being limited by the engagement of the rearward portion of its top wall 105 against a pair of abutments 114 projecting from the inclined edges of the sides 41 of the arm 3, see Fig. 2.

The forward end of the driver-lever 4 is closed by a front wall 115, to the inner face of which is secured a block 116 forming the suspension means for the staple-driver 100. The block 116 is riveted, welded or otherwise suitably secured to the front wall 115 of the lever 4 and is provided at its lower end with a rearwardly facing notch 117 forming a lower lip or lug 118.

The staple-driver 100 consists in a relatively thin flat plate of hardened metal shown in perspective view in Fig. 14. Bisecting the driver-blade 100 is a vertical slot 101 terminating at the top in a T-slot 102. The T-slot 102 is adapted to receive the lug 118 on the block 116 at the forward end of the driver-lever 4 whereby to suspend the driver 100 therefrom with its lower portion slidably held between the forward end of the staple-core 60 and the rearward face of the front wall 91 of the gate 90, see Figs. 9 to 11. The staple-driver 100 is retained in position hooked to the lug 118 by means of a flat leaf-spring 120 abutting the rearward side of the block 116. The upper portion 121 of the spring 120 is bent at right-angles to underlie the top wall 105 of the lever 4, being secured thereto by any suitable means such, for example, as the screws 122. The screws 122 also serve as a means for fastening in place a hand-rest 125 seated on top of the forward end of the lever 4. Preferably, the hand-rest 125 consists in a block or plate of material such as sold under the trademark "bakelite", its under side being recessed to adapt it to fit around the sides and front of the lever 4 and its edges being rounded to provide a smooth finish. It will be observed from the foregoing description that the lever 4 is adapted to be operated by pressing the hand against the rest 125 to cause it to swing downwardly about its pivot 79 to slide the driver 100 down across the front of the staple-core 60 to drive the staples into the work. The downward movement of the driver-lever 4 with respect to the arm 3 is limited by the engagement of its top wall with the lugs 58, previously described as projecting upwardly from the sides 41 of the arm 3.

Pivotally mounted within the forward end of the channel-member 80 is a check-pawl or dog 130 which has several functions in connection with the stapling operation. The dog 130 is pivoted on a transverse pin 131 riveted through holes 132 in the sides of the channel-member 80, see Figs. 5 and 15. A pair of bushings 133 surround the pin 131 at either side of the dog 130 to maintain it in central position thereof. As shown in Fig. 19, the dog 130 is constructed from relatively thin hardened sheet-metal with a bird-like contour in outline. The rearward portion of the dog 130 has a head 134 formed with a depending beak 135 sharpened at its end to adapt it to engage between the heads of the staples s straddled across the core 60, see Figs. 9 and 10. At its opposite end the dog 130 has a projecting tail 136 and a depending leg portion 137. The tail 136 of the dog 130 is arranged to project through the vertical slot 101 in the staple-driver 100 and to slide down into the slot 97 in the gate 90. The upper edge of the dog is formed with a rounded protuberance 138 which has a purpose as later explained. The dog 130 is adapted to be rocked into different positions under the control of a toggle-spring 140.

Figure 7:
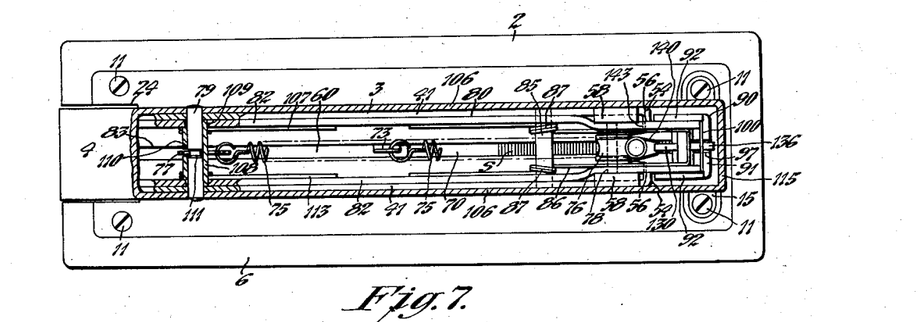
Fig. 7 is a plan view of the implement showing the stapling arm in section on line 7—7 of Fig. 1.
Figure 9:
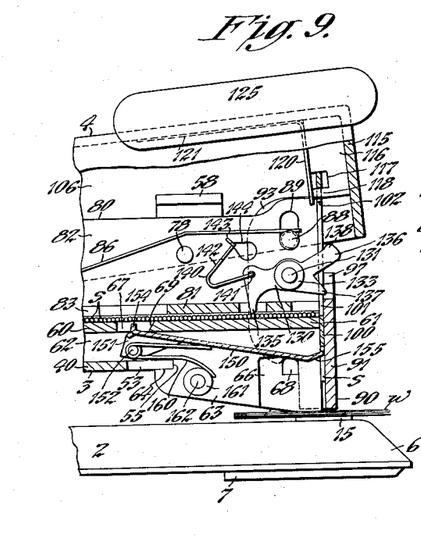
Fig. 9 is an enlarged side elevation of the fore part of the implement showing the stapling head in longitudinal section and illustrating the stapling arm as lowered against the work and the driver-lever partly depressed.

Referring to Figs. 7 and 9, the spring 140 is of substantially hairpin shape having its forward looped end hooked through a hole or eye 141 in the head of the dog 130 with its opposite legs extending rearwardly therefrom and then bent back at an angle in the reverse portions 142. The end portions of the legs 142 of the spring are bent outwardly to terminate in portions 143 which engage through the narrower ends of pear-shaped slots or openings 144 in the sides 82 of the channel-member 80. The arrangement of the toggle-spring 140 is such as to normally hold the dog 130 in the position illustrated in Figs. 9, 10 and 12 during the descent of the driver 100; but when the tail of the dog is engaged by the bottom of the block 116 on the lever 4 the dog is rocked into the position shown in Fig. 11, whereupon the spring will likewise act to retain it in this position. That is to say, the force of the spring may be applied in either direction across the axis of the pivot 131 so as to hold the dog with its head either raised or lowered.

Figure 20:
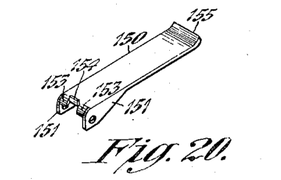
Fig. 20 is a perspective view of the staple-supporter.

Located beneath the top wall 61 of the staple-core 60 and projecting outwardly beyond the forward end thereof is a staple-supporter 150 of unique construction and arrangement. As shown in Fig. 20, the staple-supporter 150 consists of a relatively flat sheet-metal blade having ears 151 projecting downwardly from its sides at its rearward end and pierced to receive a transverse pin 152. The rearward extremity of the supporter 150 is bent downwardly in portions 153 conforming to the curve of the ears 151 and between these curved portions is a lug or ear 154 bent upwardly at right-angles to the blade. The ear or lug 154 projects upwardly through a slot 67 in the top of the staple-core 60, the forward edge of the slot being beveled as shown at 69 in Fig. 16. The ear 154 engages across the beveled edge of the slot 67 to arrest the forward sliding movement of the supporter to cause its outer end to be released from the staple as the driver 100 reaches the end of its descent, see Fig. 10. The forward end of the staple-supporter 150 is bent upwardly to form an inclined lip 155 for engaging under the head of the staple s, this peculiar form of construction having a particular advantage as later explained.

Figure 5:
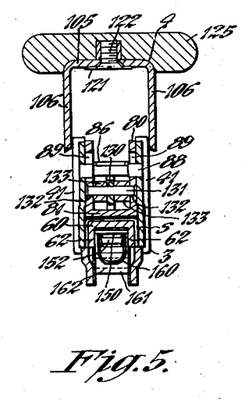
Fig. 5 is a transverse sectional view of the stapling head of the implement taken on line 5—5 of Fig. 2.
Figure 11:
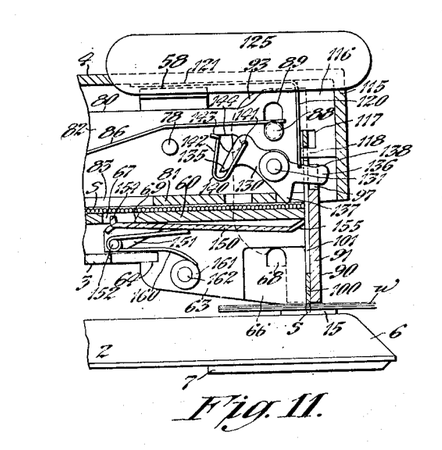
Fig. 11 is a similar part-sectional view showing the driver-lever depressed to the full extent to complete the clinching of the staple.
Figure 12:
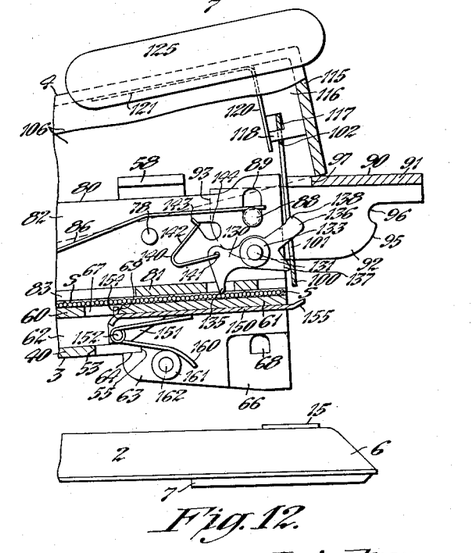
Fig. 12 is a similar view showing the stapling arm elevated and the driver-lever raised and illustrating the door or gate at the front of the stapling arm opened for filling the magazine with a supply of staples.

The staple-supporter 150 is normally held raised against the under side of the top wall 61 of the core 60, see Fig. 12, by means of a spring 160. Referring to Fig. 5, the spring 160 is of hairpin shape with its forward looped end curled downwardly to overlie the periphery of a roller 161 journaled on a transverse pin 162 which is riveted through the sides of the depending wings 63 of the staple-core 60. Rearwardly of its looped portion the opposite legs of the spring 160 are coiled around the pin 152 between the ears 151 of the supporter, see Fig. 5. Through the last-described construction the staple-supporter 150 is mounted to allow its forward end to swing downwardly with the descent of the staple and also to adapt it to slide rearwardly to permit its forward end to swing upwardly upon its release from the staple at the end of the stroke of the driver 100. As the supporter 150 is released from the staple the spring 160 swings it upwardly into the position shown in Fig. 11. During the receding movement of the supporter the curved looped portion of the spring 160 rides back on the roller 161 with the latter turning to relieve the friction. Then when the driver is raised again after the staple has been applied to the work the curved ends of the spring 160 will slide on the roller 161 to project the supporter forwardly until its forward end brings up against the front wall of the gate 90 with the lip 155 in position to receive the next staple fed off from the core 60, see Fig. 9. The method of operation of the complete device is as next explained.

The implement is loaded by opening the gate 90 at the forward end of the arm 3 and inserting a strip or stick of attached staples in the form usually supplied as a refill. The knurled sides of the gate 90 are grasped between the fingers whereby to lift the gate against the action of its spring 86 with the trunnion-pin 88 sliding upwardly in the slots 89. This action releases the detent-ears 68 from the notches 96 in the gate 90 to permit it to be swung outwardly into the position indicated in Fig. 12. As the gate 90 is opened the driver 100 is allowed to swing forward, thereby permitting the dog 130 to be rocked downwardly from the position shown in Fig. 2 under the action of its spring 140 to engage its beak 135 with the crossbar of one of the staples s so that if any staples remain in the magazine they will not be ejected by the force of the pusher 70 impelled by its spring 75. As the staple-stick or refill is pushed into the magazine with the legs of the staples s straddling the core 60 the dog 130 acts as a check-pawl by riding over the tops of the staples and engaging successively therewith to prevent them from being ejected.

After the staple-stick has been pushed clear into the magazine the gate 90 is closed by swinging it downwardly to cause the curved edges 95 of its sides 92 to ride across the top of the detent-ears 68 with the spring 86 acting to force the gate downwardly to engage its notches 96 with the ears. As the gate is closed and latched in this manner it forces the driver 100 back into place against the forward edge of the staple-core 60 and through the engagement of the lower end of the driver with the leg 137 of the dog 130 the latter is swung back into the position shown in Fig. 2, thereby releasing its beak 135 from the staples to permit the pusher 70 to feed them forwardly. The implement is then ready for operation.

For general use in attaching papers and the like the implement is arranged with the stapling arm 3 adjusted to the position shown in Fig. 1 and supported by the end of the latch 30 resting against the leaf-spring 35. When it is desired to use the implement for stapling or stitching thicker work, for example, in attaching tags or labels to articles of commerce, the arm 3 may be manually raised to the position shown in Fig. 2, the engagement of the shoulder 33 of the latch with the beveled rim 28 in the opening 26 of the hinge-block 23 operating to limit such upward movement of the arm. For other classes of work such as tacking labels to boxes the base 2 is turned back into the position illustrated in Fig. 13 of the drawings so that the staple may be driven directly into the work without clinching it on the under side thereof.

With any of these methods of use the stapling mechanism is operated by pressing the hand against the rest 125 on the driver-lever 4. It is to be noted that the spring 107 which holds the lever 4 raised above the arm 3 is of greater tension than the spring 35 which sustains the arm in elevated position. Consequently, the first pressure of the hand on the rest 125 will cause the arm 3 to be swung downwardly about its pivot 25 to seat the forward edges of the wings 63 on the core 60 against the work w which has previously been laid across the top of the anvil 15 on the base 2, see Fig. 9. As pressure on the hand-rest 125 is continued the driver-lever 4 will be swung downwardly about its pivot 79, thereby sliding the staple-driver 100 downward in the throat-like space between the end of the staple-core 60 and the forward wall 91 of the gate 90; it being understood that the upper edge of the driver engages against the upper side of the slot 117 in the block 116 to apply the force of the lever to the driver.

Assuming that a staple has been fed off the end of the core 60 into the throat of the gate 90, this staple is held suspended upon the projecting lip 155 of the supporter 150 during the descent of the driver 100. As the driver 100 descends the staple-supporter 150 retains the staple in engagement with its lower edge, the forward end of the supporter swinging downwardly in the manner indicated in Fig. 9 of the drawings. As the supporter 150 swings downwardly its rearward end slides forwardly on the under side of the staple-core 60, the curved portion of the spring 160 sliding around the roller 161 to effect this action and the roller being rotated thereby on its journal 162. As the driver 100 nears the end of its descent the ear 154 on the supporter 150 brings up against the beveled end 69 of the slot 67 in the core 60, thus preventing any further forward movement of the supporter. Consequently, the further forward movement of the supporter will cause its forward end to be withdrawn from under the staple at the completion of the driving operation.

The upwardly inclined lip 155 at the forward end of the supporter 150 is provided for the purpose of applying a frictional force to the head of the staple to prevent the latter from rocking to cant its legs rearwardly during the first portion of its descent. That is to say, as the staple-supporter 150 slides forwardly during its downward swinging movement its angular lip 155 tends to push against the under side of the staple to hold its legs against the front wall of the gate 90 to prevent them from canting rearwardly. The staple is thus maintained in its proper course during the driving operation whereby to eliminate the danger of its legs becoming misalined with the driver to thereby jam and clog the machine.

Figure 10:
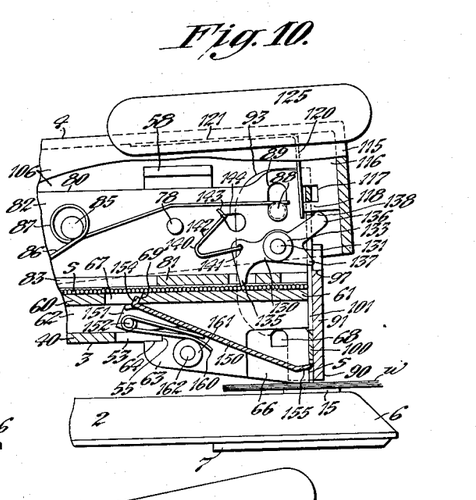
Fig. 10 is a similar part-sectional view showing the driver-lever further depressed in the act of driving a staple into the work.

During the greater part of the descent of the driver 100 the check-pawl or dog 130 remains in the position shown in Figs. 9 and 10 with its beak 135 engaged with the crossbar of one of the staples s in the series straddled across the core 60 so that the pressure of the staple-pusher 70 on the staples is resisted to prevent the forward staple from binding against the driver to retard its motion; the thickness of the driver being slightly less than that of the staple. It has been found that a difference in thickness of the staple and its driver to provide a clearance of less than one thousandth of an inch is effective to prevent the forward staple from binding against the face of the driver. In this way the driver is relieved of the friction of the foremost staple against its rearward side and therefore its action is rendered easier so that less pressure is required on the lever 4. This feature of improvement makes for a much easier action of the stapling mechanism without chance of the parts binding or sticking as is frequently the case in previously used devices of the present type.

As the downward movement of the lever 4 is continued the lower edge of the block 116 at its forward end eventually engages with the rounded protuberance 138 on the end of the tail 136 on the dog 130, see Fig. 10, to rock the latter on its pivot 131 until the direction of force of the spring 140 is reversed to carry the dog into the position shown in Fig. 11. The dog 130 clicks into the position shown in Fig. 11 at the end of the stroke of the driver 100 in completing the operation of driving the staple into the work and clinching its legs on the under side thereof. Then, as pressure is released on the hand-rest 125, the lever 4 will be swung upwardly by its spring 107 and thereafter the arm 3 will be raised by its spring 35 into the position shown in Fig. 1.

As the lever 4 is swung upwardly it retracts the driver 100 until its lower edge is raised above the top of the staple-core 60, whereupon the staple-pusher 70 functions to feed another staple into the throat of the gate 90. It will be understood that as the staple-driving operation is completed the lip 155 on the supporter 150 is released from the staple and the supporter is then swung upwardly by its spring 160 into the position shown in Fig. 11. As the supporter swings upwardly it slides rearwardly with the curved end of the spring 160 riding across the top of the roller 161. Then after the driver 100 has ascended the curved end of the spring 160 rides forwardly on the roll 161 to automatically draw the staple-supporter forwardly to project its lip 155 beneath the driver in position to support the next staple fed off from the core 60.

The dog 130 remains in the position illustrated in Fig. 11 until the staple-driver 100 has been raised sufficiently to engage the bottom of its slot 101 with the tail 136 on the dog, whereupon the latter is rocked back across center and the toggle-spring 140 carries it into the position shown in Fig. 2 with the end of its leg 137 bearing against the rearward face of the driver 100. The dog 130 is held in the position last described with its tail 136 projecting through the slot 101 in the driver 100 until the latter starts to descend again with the leg 137 of the supporter engaged with the lower part of the driver below the end of the slot 101. At the first downward movement of the driver 100 the bottom of its slot 101 passes below the leg 137 of the dog 130 and the toggle-spring 140 comes into action to rock the dog into the position shown in Fig. 9 to carry its beak 135 into engagement with the crossbar of one of the staples s on the core 60 to hold the staples against the pressure of the pusher 70.

It has been stated that the dog 130 has more than one function and it will now be explained how this element acts to detain the return of the driver 100 to prevent the feeding of a second staple until the previously fed staple has been applied to the work. After the dog 130 has been rocked downwardly into the position shown in Fig. 9 with its leg 137 projecting through the slot 101 in the driver 100 it is not released from this position until the driver has descended nearly to the full extent of its downward movement. As indicated in Fig. 10, the bottom of the block 116 on the lever 4 does not engage the end of the tail 136 on the dog 130 until the driver has nearly reached the end of its downward stroke and even though the dog may be rocked to some extent thereafter it will not be carried into position to cause the toggle-spring 140 to throw it across center until the staple is partly driven into the work. Consequently, while the dog 130 remains in the position shown in Fig. 10 its leg 137 will act as a pawl or detent to prevent the driver 100 from rising to a point where its lower edge is above the top of the staple-core 60. In other words, unless the operator makes a full stroke before releasing the lever 4 the driver 100 will be detained in its upward movement by the end of its slot 101 engaging against the leg 137 on the dog 130. In this way, the driver is controlled to prevent it from releasing the foremost staple on the end of the core 60 to allow it to be fed forwardly until the previously fed staple has been applied to the work.

It will be observed from the foregoing that the present invention provides a particularly efficient device of the type indicated which is adapted to a wide range of use for attaching papers, stapling tags and tickets to various articles of commerce and also for fastening articles to other objects.

The stapling mechanism is simple in construction, proof against derangement or getting out of order and durable in use over long periods.

As a further feature of the invention, means are provided for resisting the feed of the staples during the stapling operation so as to relieve the pressure on the staple-driver and thereby render the implement more convenient of operation with less exertion. The invention also provides against clogging of the staples in the implement to interfere with its operation or injure the parts through the means which prevent the feeding of a second staple before the one previously fed has been applied to the work.

The improved device besides being simple in construction and ornamental in appearance is light in weight and compact in size thus rendering it more convenient in use either as a desk implement or for other purposes.

While the invention is herein illustrated and described as embodied in a preferred form of construction for use with wire staples, it is to be understood that modifications may be made in the structure and arrangement of the parts of its mechanism to adapt it for applying other types of fasteners without departing from the spirit or scope of the invention. Therefore, without limiting myself in this respect, I claim:

1. In an implement of the type indicated, the combination of a stapling arm, a guideway for the staples at the end of the arm, means for successively feeding the staples into the guideway, a driver-lever movable with respect to the arm and provided with a lug at its forward end projecting rearwardly therefrom, a staple-driver formed with an opening for receiving the lug on the lever and slidable in the guideway, and yielding means for engaging the lug and releasably retaining the driver in hooked connection with the lever.

2. In an implement of the type indicated, the combination of a stapling arm having a guideway for receiving a staple, means for successively feeding staples into the guideway, a driver-lever movable with respect to the arm, a lug at the end of the lever, a staple-driver slidable in the guideway and formed with an opening at its upper end for engaging the lug on the lever, and a leaf spring bearing against the lug to retain the driver in connection with the lever.

3. In an implement of the type indicated, the combination of a base, an arm hinged to said base, fastener-applying means carried by the arm, and yieldable means for restricting the upward movement of the arm when it is raised to a limited extent above the base, said means being releasable to permit the arm to be raised beyond its normal limit to adapt the implement to operate on work of extreme thickness.

4. In an implement of the type indicated, the combination of a base, an arm hinged to said base, fastener-applying means carried by the arm, means for normally maintaining the arm in raised position with respect to the base, and detent-means for limiting the upward movement of the arm with respect to the base, said detent-means being releasable to adapt the arm to be swung to extreme position with respect to the base.

5. In an implement of the type indicated, the combination of a base, an arm hinged to said base, fastener-applying means carried by said arm, resilient means for maintaining the arm normally in raised position with respect to the base while adapting it to be lowered thereagainst, detent-means for limiting the upward movement of the arm, and resilient means for operating the detent-means to adapt it to be released to allow the arm to be swung back in substantially alined relationship with the base.

6. In an implement of the type indicated, the combination of a base, an arm hinged to said base, fastener-applying means on the arm, resilient means for maintaining the arm in raised position with respect to the base, a detent-latch, means engageable by the latch to limit the upward movement of the arm with respect to the base, and a spring for operating the latch to adapt it to be released to allow the arm to be swung back into substantial alinement with the base.

7. In an implement of the type indicated, the combination of a base, an arm hinged to the base, fastener-applying means carried by the arm, a spring on the base, a latch on the arm cooperating with the spring to maintain the arm normally raised with respect to the base, detent-means on the base for engaging the latch to limit the upward movement of the arm, and a spring for operating the latch to releasably retain it in engagement with the detent-means.

8. In an implement of the type indicated, the combination of a base, an arm hinged to said base, fastener-applying means carried by the arm, a spring on the base, a latch slidable on the arm and adapted to engage the spring to maintain the arm in raised position with respect to the base, detent-means on the base, and a spring for sliding the latch to engage it with the detent-means to limit the upward movement of the arm with respect to the base.

9. In an implement of the type indicated, the combination of a base bounded by a flanged rim, said base formed with an opening, a leaf spring secured on the under side of the base, an arm hinged to said base, fastener-applying means carried by the arm, and means on the arm projecting through the opening in the base to bear against the spring to maintain the arm normally in raised position while adapting it to be rocked downwardly toward the base.

10. In an implement of the type indicated, the combination of a channel-shaped arm having a bottom wall and upstanding sides, said bottom wall formed with an opening, a channel-shaped core enclosed within the sides of the arm and provided with lugs on its sides projecting through the opening in the bottom wall of the arm, said core formed with notches at its forward end engaging the forward edge of the bottom wall of the arm to secure the core in place therein, means for feeding fasteners along the core in the arm, and means for applying the fasteners to the work.

11. In an implement of the type indicated, the combination of a channel-shaped arm having a bottom wall and upstanding sides, said arm formed with an opening in its bottom wall, a staple-core of inverted trough-shape arranged within the arm and provided with lugs on its sides engaging the opening in the bottom of the arm, said core formed with wings projecting downwardly from its sides at its forward end and provided with slots for engaging the edge of the bottom wall of the arm, means for feeding staples along the core in the arm, and means for applying the staples to the work.

12. In an implement of the type indicated, the combination of a base, a channel-shaped arm pivoted to the base, fastener-applying mechanism carried by said arm, a lever of inverted trough shape pivotally mounted with respect to the arm and arranged with its side walls overlapping the sides of the arm and enclosing the latter throughout its length, said lever being formed with a depending portion at its rearward end overlapping the rearward end of the arm, and means for connecting said lever to operate the fastener-applying mechanism.

13. In an implement of the type indicated, the combination of a base, an arm hinged to the base, fastener-applying mechanism carried by said arm, a lever of inverted trough shape arranged with its sides enclosing the sides of the arm throughout the length of the latter and pivoted thereto, the rearward end of said lever being inclined downwardly at an angle to its main portion to overhang the end of the arm, and means for connecting said lever to operate the fastener-applying mechanism.

14. In an implement of the type indicated, the combination of a channel-shaped arm, a channel-shaped staple-core enclosed within the sides of the arm and secured to the bottom wall thereof, a trough-shaped staple-guide having its side walls extending in the opposite direction from the side walls of the staple-core and arranged above the latter with its bottom wall in spaced relation thereto, means for feeding staples along the core beneath the staple-guide, means for driving the staples into the work, and means for operating the staple-driving means.

15. In an implement of the type indicated, the combination of a channel-shaped arm, a channel-shaped staple-core extending longitudinally between the sides of the arm, a trough-shaped staple-guide extending above the staple-core in spaced relation thereto, a staple-driver, means for feeding staples on the core to deliver them successively to the driver, a driver-lever of channel shape arranged with its sides overlapping and enclosing the sides of the arm throughout its length and pivoted thereto, and means connecting the lever to operate the staple-driver.

16. In an implement of the type indicated, the combination of means forming a guideway for receiving a staple, a staple-driver reciprocable in said guideway, a staple-supporter projecting beneath the driver to support a staple fed into the guideway, means for mounting said supporter to adapt it to swing downwardly during the descent of the driver and to move rearwardly to allow it to swing upwardly when released from the staple, and a spring for maintaining said supporter in elevated position, said spring movable rearwardly with the supporter and adapted to advance the latter into position beneath the driver when the latter is raised in the guideway.

17. In a stapling or wire-stitching mechanism, the combination of means forming a guideway for receiving a staple, a driver reciprocable in said guideway to drive the staple into the work, means for actuating the driver, a staple-supporter slidable across the guideway to project its end beneath the staple and adapted to swing downwardly with the descent of the driver, a spring mounted on the supporter, and an abutment engaged by the end of the spring to force the supporter upwardly, said spring being adapted to ride over the abutment as the supporter is raised after its release from the staple to pry the supporter forwardly after the ascent of the driver to insert it beneath the staple fed into the guideway.

18. In a stapling or wire-stitching mechanism, the combination of a staple-core, a staple-driver reciprocable across the end of the core, means for feeding the staples to deliver them successively beneath the driver, a staple-supporter slidable longitudinally of the core to project its end beneath the staple-driver, a bifurcated spring carried by the supporter with one of its portions bearing against the under side thereof and its opposite portion extending at an angle thereto and curved downwardly at its end, and a roller engaging the curved end of the spring to adapt it to ride thereover as the supporter is retracted at the end of the descent of the driver and to shift said supporter forwardly after the driver has been raised above the staple-core.

19. In a stapling or wire-stitching mechanism, the combination of a staple-core, a staple-driver reciprocable across the end of said core, means for feeding the staples on the core to successively deliver them beneath the driver, means for actuating the driver, a staple-supporter slidable with respect to the staple-core to project its end beneath the staple-driver, a pin extending laterally of the supporter, a bifurcated spring mounted on said pin with one of its portions bearing against the under side of the supporter and its opposite portion extending downwardly and curved at its end, and a roller engaging the curved portion of the spring to cause the latter to maintain the supporter in raised position while adapting it to swing downwardly with the descent of the driver, said roller also tending to cause the spring to ride forwardly thereover to project the supporter beneath the driver when the latter is raised above the staple-core.

20. In an implement of the type indicated, the combination of a magazine for containing a supply of fasteners, a driver reciprocable across the end of the magazine for driving the fasteners into the work, means for actuating the driver, pusher-means for feeding the fasteners from the magazine to the driver, and detent-means for resisting the action of the pusher-means during the operative stroke of the driver to relieve the pressure of the fasteners thereagainst.

21. In an implement of the type indicated, the combination of a magazine for holding a supply of fasteners, a driver reciprocable across the end of the magazine for applying the fasteners to the work, means for operating the driver, pusher-means for feeding the fasteners in the magazine to deliver them successively to the driver, and detent-means engageable with the fasteners during the operation of the driver to relieve their pressure thereagainst, said detent-means being released at the end of the descent of the driver to permit the feeding of a fastener after the driver returns to inoperative position.

22. In an implement of the type indicated, the combination of a magazine for holding a supply of fasteners, a driver reciprocable across the end of the magazine for applying the fasteners to the work, pusher-means for feeding the fasteners in the magazine to deliver them successively to the driver, detent-means for preventing the feeding of the fasteners during the operative stroke of the driver, and means for releasing said detent-means to permit the feeding of a fastener into driving position upon the return of the driver to inoperative position.

23. In an implement of the type indicated, the combination of a magazine for containing a supply of fasteners, a driver reciprocable across the end of the magazine to drive the fasteners into the work, means slidable in the magazine for feeding the fasteners to deliver them successively to the driver, a detent-pawl engageable with the fasteners to resist their feeding movement, and means operative during the descent of the driver to maintain the pawl engaged with the fasteners.

24. In an implement of the type indicated, the combination of a magazine for containing a supply of fasteners, a driver reciprocable with respect to the magazine to drive the fasteners into the work, means for feeding the fasteners to deliver them successively to the driver, a pawl rockable into position to engage the fasteners to prevent them from feeding, a spring acting to maintain said pawl in either engaged or released position, and means operative to cause the pawl to be shifted into engagement with the fasteners at the beginning of the descent of the driver and to be released from engagement with the fasteners at the end of the operative stroke of the driver.

25. In an implement of the type indicated, the combination of a magazine for holding a supply of fasteners, a slotted driver reciprocable with respect to the magazine, means for feeding the fasteners in the magazine to deliver them successively to the driver, a pawl rockable to engage the fasteners to prevent their feeding movement and having a tailpiece projecting through the slot in the driver, and a spring for maintaining the pawl in engagement with the fasteners during the descent of the driver, the tailpiece on the pawl being engageable to rock the latter to release it from engagement with the fasteners at the end of the descent of the driver.

26. In an implement of the type indicated, the combination of a magazine for containing a supply of fasteners, a driver reciprocable with respect to the magazine and formed with a longitudinal slot, means for feeding the fasteners in the magazine to successively deliver them to the driver, a pawl rockable to engage the fasteners to prevent their feeding motion and having a portion extending through the slot in the driver, and a spring for maintaining the pawl in engagement with the fasteners, said pawl being actuated at the beginning of the descent of the driver to engage it with the fasteners and at the end of the descent of the driver to release it from the fasteners.

27. In an implement of the type indicated, the combination of a magazine for containing a supply of fasteners, a driver reciprocable with respect to the magazine and formed with a longitudinal slot, means for feeding the fasteners in the magazine to successively deliver them to the driver, a pawl rockable to engage the fasteners to prevent them from feeding and having a portion extending through the slot in the driver, and a spring for maintaining the pawl either engaged with or disengaged from the fasteners, the portion of the pawl projecting through the slot in the driver being engageable to rock the pawl to release it from the fasteners at the end of the descent of the driver and also engageable with the end of the slot in the driver during the ascent of the latter to rock the pawl into position to effect its reengagement with the fasteners under the action of its spring as the driver starts to descend.

28. In an implement of the type indicated, the combination of a magazine for containing a supply of fasteners, a driver for appylying the fasteners to the work, means for feeding the fasteners to deliver them successively to the driver, and a dog movable into position to prevent the return of the driver after an incomplete stroke of the latter and shifted from such position when the driver reaches the end of its downward stroke, said dog being actuated during the downward stroke of the driver to engage it with the fasteners in the magazine to prevent them from being urged forward against the face of the driver.

29. In an implement of the type indicated, the combination of a magazine for containing a supply of fasteners, a driver for driving the fasteners into the work, means for feeding the fasteners to deliver them successively to the driver, a dog pivoted to directly engage the driver to prevent its full return movement, means movable with the driver to release the dog when the driver makes a complete stroke, and a spring having one end fixed and its opposite end connected with the dog, said spring being adapted to actuate the dog with a snap action when its end connected to the dog is shifted across a plane common to the axis of the dog and the opposite fixed end of the spring.

30. In an implement of the type indicated, the combination of a magazine for containing a supply of fasteners, a driver for driving the fasteners into the work, said driver formed with a slot extending in the direction of its movement, means for feeding the fasteners to successively deliver them beneath the driver, a pivoted dog having a portion adapted to engage the end of the slot in the driver to prevent its full return movement, means operative at the end of the downward stroke of the driver to shift the dog, and a spring operative to continue the movement of the dog to carry it into position to permit the return of the driver.

31. In an implement of the type indicated, the combination of a magazine for containing a supply of fasteners, a driver reciprocable with respect to the magazine and formed with a longitudinal slot, a dog rockable to engage the fasteners to prevent their feeding motion, said dog having a portion projecting through the slot in the driver, a spring for controlling the position of the dog, means operative during the descent of the driver to shift the dog to engage it with the fasteners and to position it to engage the end of the slot in the driver to prevent the return of the latter, and means operative at the end of the stroke of the driver to shift the dog into position to permit return of the driver.

32. In an implement of the type indicated, the combination of a staple-driver, a staple-supporter projecting beneath the driver to support a staple being driven thereby, means for mounting the staple-supporter to adapt it to slide forward bodily with its forward end swinging downwardly during the descent of the driver, and means to limit the forward movement of the supporter to cause its end to be withdrawn from the staple as the driver reaches the end of its descent.

33. In an implement of the type indicated, the combination of means forming a guideway for receiving a staple, a staple-driver reciprocable in said guideway, a staple-supporter arranged with its forward end projecting into the guideway beneath the driver, means for mounting said supporter to adapt it to slide forward bodily with its forward end swinging downwardly with the staple, and means to limit the sliding movement of the supporter to cause its forward end to be released from the staple.

34. In an implement of the type indicated, the combination of a staple-driver, a staple-supporter adapted to project beneath the driver to support a staple being driven thereby, means for mounting said supporter to adapt it to slide forward bodily and to swing downwardly during the descent of the driver, means for sliding the supporter, and means for limiting the sliding movement of the supporter to cause its end to be withdrawn from beneath the staple at the end of the stroke of the driver.

35. In an implement of the type indicated, the combination of a staple-driver, a staple-supporter projecting beneath the driver to support a staple as it is being driven thereby, said supporter having an inclined lip at its end for engaging beneath the head of the staple, and means for sliding said supporter forwardly as it swings downwardly with the driver to cause its lip to act frictionally on the staple to prevent it from rocking to cant its legs rearwardly.

36. In an implement of the type indicated, the combination of means providing a guideway for receiving a staple, a staple-driver reciprocable in said guideway, a staple-supporter projecting beneath the driver and formed to engage beneath the head of a staple being driven by the driver, means for mounting the supporter to adapt its forward end to swing downwardly with the driver, and means to slide the supporter forwardly during its swinging movement to cause its forward end to exert a force on the staple tending to prevent its legs from rocking or canting rearwardly.

37. In an implement of the type indicated, the combination of a base, a channel-shaped arm hinged to said base, fastener-applying means carried at the forward end of the arm, a lever of inverted trough-shape pivotally connected to the rearward end of said arm in overlying relation thereto with its sides overlapping the sides of the arm and enclosing the latter throughout its whole length, said lever having a lateral wall at its forward end adjacent to and enclosing the end of the arm, a hand-rest at the forward end of said lever directly above the fastener-applying means, and means for connecting the lever to operate the fastener-applying means.

ARTHUR H. MAYNARD.